Dec. 7, 1943. D. J. CAMPBELL 2,336,447
SPEED CONTROL DEVICE FOR MOTOR VEHICLES
Filed Oct. 27, 1942
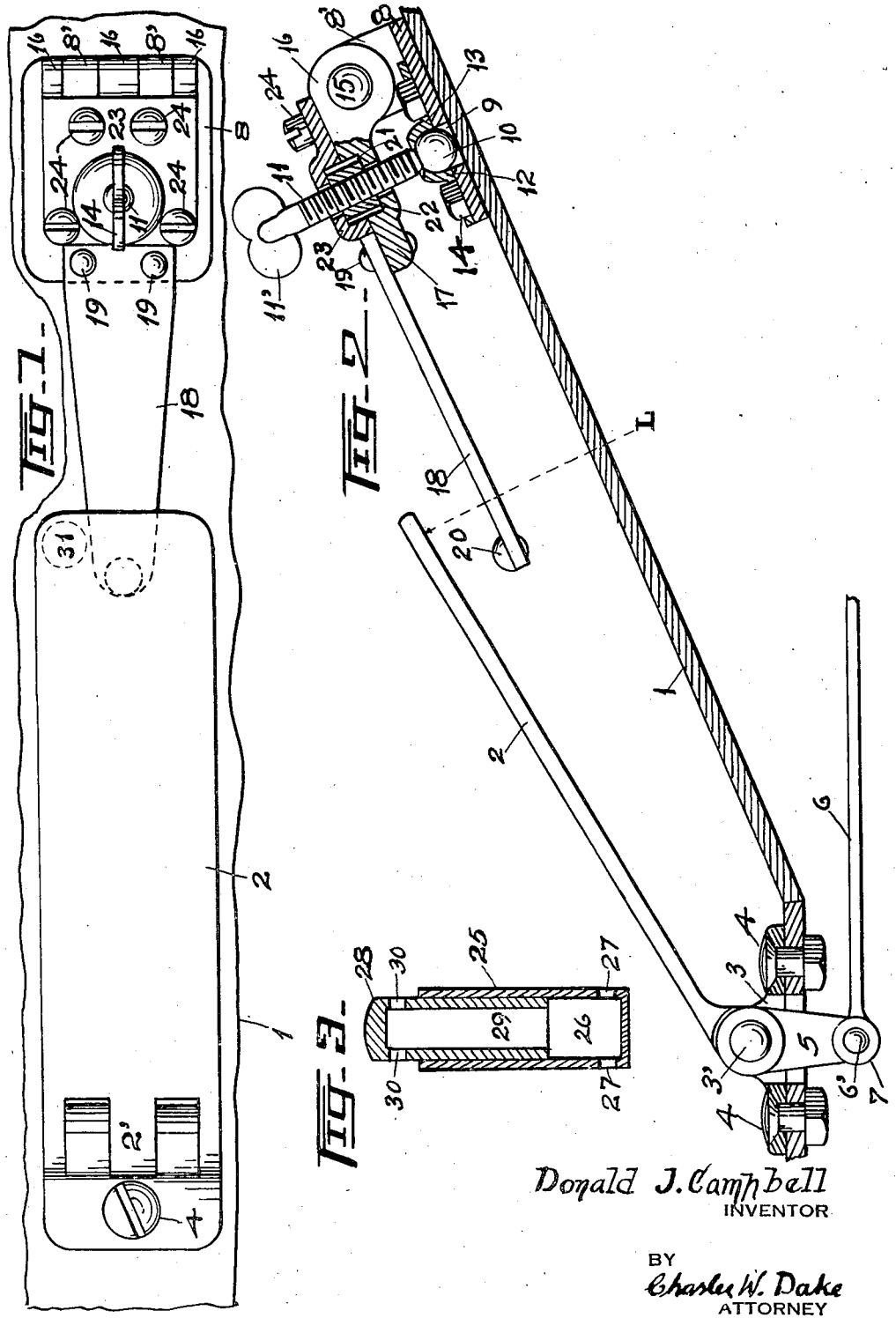
Donald J. Campbell
INVENTOR
BY
Charles W. Dake
ATTORNEY Patented Dec. 7, 1943

2,336,447

UNITED STATES PATENT OFFICE 2,336,447

SPEED CONTROL DEVICE FOR MOTOR VEHICLES

Donald J. Campbell, Spring Lake, Mich., assignor to Islay Investment Incorporated, a corporation of Michigan Application October 27, 1942, Serial No. 463,513

5 Claims. (Cl. 74—526)

My present invention relates to improvements in speed control devices for motor vehicles such as trucks, busses and automobiles whereof the operating speed is limited by law and the objects of improvement are: first, to provide a speed control device whereby the operator of the motor-driven vehicle will be warned when the vehicle has reached the speed permitted by law and is about to exceed that speed; second, to provide a speed control device for motor driven-vehicles that will warn the operator of a motor-driven vehicle when the speed permitted by law has been reached; third, to provide a speed control device that will warn the operator of a motor-driven vehicle that the speed of the vehicle has reached the speed permitted by law for normal operation and will permit the vehicle to be operated at a greater speed for passing another vehicle traveling in the same direction, or when emergency requires; fourth, to provide a speed control device that be cheap to fabricate and readily understood.

I attain these named objects and such other objects as appear from a perusal of the following description assisted by the accompanying drawing, in which—

Figure 1 is a plan view of my vehicle speed control device as when looking downward along line L of Figure 2.

Figure 2 is a vertical part sectional view of my vehicle speed control device.

Figure 3 is a longitudinal cross-sectional view of the gauge by which both the treadle and carburetor of the engine can be set for the permissible driving speed of the vehicle.

Throughout the three views of the accompanying drawing illustrating my vehicle speed control device, similar numerals refer to similar parts or portions of the device, and referring to the drawing:

Numeral 1 refers to the foot board of a motor-driven vehicle, numeral 2 the foot treadle supported by bracket 3 secured to the foot board 1 by bolts 4, and pivoted for downward and upward swing movement on pin 3' extending through the bracket 3 and hinge lugs at the end of the treadle 2, one of said lugs having arm 5 extending downward through the foot board 1 where it is pivotally connected to rod 6 by pin 6' extending through the eye 7 and arm 5. Numeral 8 refers to a second bracket secured to the foot board 1 in spaced apart relation to treadle supporting bracket 3; the said bracket 8 has upwardly inclined extending hinge lugs 8' and hole 9 in which is ball 10 of adjusting screw 11; the said ball is held in the hole 9 against any upward pull on the adjusting screw 11 by members 12 and 13, each having a concave surface fitting contour of the ball at one of its sides and secured to the bracket 8 by either screws or rivets that do not show in the drawing. Cap screws 14 secure the bracket 8 to the foot board 1. Hinge pin 15 extends through the hinge lugs 8' and hinge members 16 of the upward and downward swingable bracket 17 having secured thereto the elongated spring 18 secured to the bracket 17 preferably by rivets 19; the said elongated spring has at its free end upwardly extending button 20 for engaging the under side of the foot treadle 2 when the treadle is depressed; the said button may have a roller substituted therefor. Numeral 21 refers to an internally screw-threaded nut resting in pocket 22 of the bracket 17 and engaging the adjusting screw 11 turnable in the nut by wings 11' at the free end of the screw. Numeral 23 refers to the retainer member for the internally screw-threaded nut 21 and secured to the top of the hinge member 16 by screws 24. Referring to Figure 3 wherein is shown the gauge for duplicating the setting of the foot treadle and the carburetor of the engine; numeral 25 refers to a hollow tubular shell having a cavity 26 and holes 27 extending from the cavity to the atmosphere at the bottom of the cavity; numeral 28 refers to a second member slidable in the cavity 26 of the member 25; numeral 29 refers to the cavity in the member 27 which has near its top, holes 30 extending from the said cavity to the atmosphere; the said cavities 26 and 29 are filled with a quick-setting plastic material, such as putty or plastic wood before they are assembled together; they are then assembled with the open end of member 28 extending slightly into the cavity 26 of the member 25, and placed under the foot treadle 2 at the position of dotted circle 31 shown in Figure 1 and the arrowhead of line L shown in Figure 2.

In operation, the engine of the vehicle having been started, the vehicle is driven at a speed below the speed allowed by law until the engine has warmed up, after which the foot treadle is depressed until the vehicle is travelling at the speed permitted, at which speed the plastic material in the cavities of the members 25 and 28 is partly forced out of the cavities through holes 27 and 30; the gauge is then removed from under the foot treadle and the plastic is permitted to harden and in doing so causes the members 25 and 28 to be cemented together with an overall length equal to the distance between the foot treadle and the floor board 1 when the foot treadle has been depressed to the position at which the fuel from the carburetor to the engine is controlled in quantity to drive the vehicle at the speed limit prescribed by law. When the plastic in the cavities 26 and 29 has hardened, the gauge is placed again under the treadle and the swingable bracket 17 is adjusted by the adjusting screw 11 until the button 20 at the free end of the elongated spring 18 engages the under-side of the foot treadle when the foot treadle is depressed against the gauge, in which position the adjusting screw 11 may be held against turning by having the ball 10 slightly oval or flatted at two sides, in which case the concave members 12 and 13 spring against the low portions of the ball and prevent self-movement of the adjusting screw.

In starting to drive the vehicle, the foot treadle is depressed as would be had there not been my speed control device present. When the vehicle has been started, pressure on the foot treadle is released and again depressed against the button 20 of the elongated spring 18, which, because of its considerable stiffness, resists further depression of the treadle to increase the speed of the vehicle above the speed permitted; this resistance of treadle depression beyond the pressure exerted to drive the vehicle at the speed permitted is many times greater than the pressure required to depress the treadle to contact the button 20; therefore there is first the depression of the treadle to drive the vehicle at the speed permitted, and second the depression of the treadle against the tension of the elongated spring 18 when the vehicle is driven at a higher rate of speed than the restricted speed permitted by law; thus it will be seen that when the treadle has been depressed until it contacts the button 20 of the elongated spring 18, further depression of the treadle is resisted to such extent that the driver of the vehicle will be warned that the speed of the vehicle is about to be increased beyond the permissible speed.

Having described my present invention, the rights thereto I desire are set forth in the hereafter numbered claims; and I claim:

1. The combination, in a speed control device for motor driven vehicles having a foot board and a depressible treadle in hinged relation with the foot board for varying the speed of the vehicle, a bracket secured to the foot board in spaced-apart relation to the treadle, a second bracket having hinged relation with the first-named bracket, a plate spring secured to the second-named bracket and having a free end extending under the depressible foot treadle and engaging the foot treadle when the foot treadle has been depressed a predetermined distance, an internally screw-threaded nut loosely carried by the second-named bracket and having a bracket and plate spring adjusting screw extending through the said internally screw-threaded nut with a ball at one of its ends socketed in the first-named bracket with a pair of concave portions engaging the ball above its horizontal axial plane, and means at the upper end of the said adjusting screw for turning the screw to adjust the free end of the plate spring in spaced-apart relation to the said foot treadle.

2. The combination, in a speed control device for motor driven vehicles having a foot board and a depressible treadle in hinged relation with the foot board for varying the speed of the vehicle, a bracket secured to the foot board, a second bracket having hinged relation with the first-named bracket, a plate spring secured to the second-named bracket and having a free end extending under the depressible foot treadle and engaging the foot treadle when the foot treadle has been depressed a predetermined distance, an internally screw-threaded nut carried by the second-named bracket and having a bracket and plate spring adjusting screw extending through the said nut with a ball at one of its ends socketed in the first-named bracket with a pair of concave portions engaging the ball above its horizontal axial plane, and means at the upper end of the said adjusting screw for turning the screw to adjust the free end of the plate spring in spaced-apart relation to the said foot treadle.

3. The combination, in a speed control device for motor-driven vehicles having a foot board and a depressible treadle in hinged relation with the foot board for varying the speed of the vehicle, a bracket secured to the foot board, a second bracket having hinged relation with the first-named bracket, a plate spring secured to the second-named bracket and having a free end extending under the depressible foot treadle, an internally screw-threaded nut carried by the second-named bracket and having a bracket and plate spring adjusting screw extending through the said nut with a ball at one of its ends socketed in the first-named bracket with a pair of concave portions engaging the ball above its horizontal axial plane, and means at the upper end of the said adjusting screw for turning the screw to adjust the free end of the plate spring in spaced-apart relation to the said foot treadle.

4. In combination with a motor-driven vehicle having a foot board and depressible treadle for controlling the normal speed of the vehicle, a bracket associated with the foot board in spaced-apart relation with the treadle, a second bracket hinged to the first-named bracket and having a plate spring secured thereto and extending under the treadle, an adjusting screw having threaded relation with the last-named bracket for adjusting the bracket and thereby the distance between the plate spring and the foot treadle, the said adjusting screw having a ball at its lowest end and turning wings at its upper end.

5. In a speed control device for motor vehicles having a foot board and a foot depressible treadle for controlling the speed of the vehicle; an elongated spring member associated with the foot board and having a free end extended under the foot depressible treadle and in spaced apart relation thereto, with means for adjusting the free end of the spring member in spaced apart relation to the under side of the foot depressible treadle.

DONALD J. CAMPBELL.